United States Patent [19]

Moorman

[11] Patent Number: 4,597,359
[45] Date of Patent: Jul. 1, 1986

[54] VEHICLE SAFETY PLATFORM FOR PETS

[76] Inventor: Maurice D. Moorman, 8124 Holy Cross Pl., Los Angeles, Calif. 90045

[21] Appl. No.: 691,395

[22] Filed: Jan. 14, 1985

[51] Int. Cl.$^4$ .............................................. A01K 1/035
[52] U.S. Cl. .................................................. 119/1; 119/96
[58] Field of Search ........................... 119/1, 96, 51 R

[56] References Cited

U.S. PATENT DOCUMENTS

| | | | |
|---|---|---|---|
| 758,123 | 4/1904 | Weis | 119/96 |
| 2,390,854 | 12/1945 | Thompson | 119/15 |
| 2,659,345 | 11/1953 | Herbert | 119/51 R X |
| 2,817,393 | 12/1957 | Mitchell | 155/189 |
| 2,900,956 | 4/1959 | Hoffman | 119/15 |
| 3,310,034 | 3/1967 | Dishart | 119/96 |
| 3,948,222 | 4/1976 | Longshore et al. | 119/96 |
| 3,989,008 | 11/1976 | Neumann | 119/1 |
| 4,335,679 | 6/1982 | Carlin | 119/1 |
| 4,512,286 | 4/1985 | Rux | 119/96 |

*Primary Examiner*—Hugh R. Chamblee
*Attorney, Agent, or Firm*—Henry M. Bissell

[57] ABSTRACT

A platform and safety harness for supporting and restraining a pet within a vehicle comprises a resilient base member, preferably of tubular steel, with vertical arms connected to opposite sides of the platform adjacent the rear thereof and horizontal arms spaced below and parallel to the platform, for installing the carrier on a vehicle seat with the platform supporting the pet above the vehicle seat at about the window level in the vehicle. The base member can be secured in place by a conventional vehicle seat belt. The carrier also includes a flexible, non-choking pet harness, an anchor affixed to the upper surface of the platform and a flexible lead releasably interconnecting the harness and anchor for safely restraining a pet on the platform. The platform can also include a removable water cup with lid, and a carpeted or otherwise cushioned top surface, which preferably slopes downwardly and rearwardly, to facilitate the pet bracing itself during travel of the carrier in the vehicle. The carrier is simple, durable and highly effective to protect the pet and human occupants against injury and to keep the pet calm and interested in the view through the vehicle windows.

16 Claims, 7 Drawing Figures

VEHICLE SAFETY PLATFORM FOR PETS

BACKGROUND OF THE INVENTION

1. Field of the Invention

The present invention generally relates to pet carriers and, more particularly, to a pet safety platform for use in a vehicle.

2. Description of the Prior Art

Pets such as small dogs and cats usually are transported in a vehicle either totally unrestrained or, for example when the period of travel is long, confined in a closed basket, box or cage. Transportation of small pets in the unrestrained state is dangerous because they frequently run from side to side in the vehicle and try to jump up to see through the vehicle windows. They have trouble doing so because of their small size and can therefore become car sick and/or overly excited. As is apparent from the bodies of small dogs occasionally observed on freeways, they also may fall out through an open vehicle window once they reach it. Moreover, both small and larger dogs have a habit of hanging out of open windows and, besides being in danger of falling out, may be injured by the wind and flying debris or can attack strangers close to the vehicle when the vehicle is stopped. Even when the vehicle windows are closed, unrestrained dogs and cats are readily subject to injury from collision with the parts of the vehicle interior and/or human occupants, for example as when the vehicle suddenly accelerates or decelerates, turns sharply or comes to a sudden stop, as at a traffic signal or because of a collision. Excited pets during transportation in a veicle also have a habit of climbing over the human occupants, thereby annoying them, and of forcing their way onto the tops of seats, under the steering wheel and next to the windshield, creating a safety hazard by blocking the driver's view and concentration and proper operation of the vehicle controls. Certain willful unrestrained pets when left alone in vehicles also have been known to urinate or defecate in frustration.

When, however, pets are restrained in cages, baskets or boxes while being carried in a vehicle they frequently become ill because of the constant erractic motion of the vehicle, while the pets have no visual means of orienting themselves, being unable to see outside the vehicle's windows when so confined. Moreover, such cages, boxes and the like are usually cramped and uncomfortable, but will take up valuable passenger space, are expensive and are generally strongly disliked by the pets, being, in effect, prisons.

Accordingly, there remains a need for an improved device for carrying a pet such as a small or medium sized dog or a cat in a vehicle, which device is inexpensive, durable and effective to restrain the pet in a safe comfortable manner, while permitting it a clear view out of the vehicle's windows. Such a device should be preferably compact, portable, attractive and capable of being releasably secured in place in the vehicle without necessitating the installation of special equipment or modification of the vehicle.

SUMMARY OF THE INVENTION

The improved animal carrier of this invention satisfies all the foregoing needs. The carrier is substantially as set forth in the Abstract. Thus, it comprises an animal-supporting platform of molded plastic or the like which is positioned at about vehicle window level by an attached resilient base member under the platform. The base member is designed to rest on a vehicle seat and be releasably snugly connected thereto by a conventional seat belt. The carrier is compact and takes up only the space of one normal human passenger. The carrier also includes pet tethering means in the form of a non-choking pet harness with downwardly converging chest straps and a lead releasably connected thereto and forming part of an anchor affixed to the upper surface of the platform.

Preferably, the base member is generally L- or U-shaped and comprises a spaced pair of horizontal support arms below the platform connected to vertical arms, in turn, connected to the platform preferably at the rear thereof. The base member holds the platform near horizontal and may be fabricated in one piece of tubular steel or the like. The vertical arms of the base member can be spanned by the two holders of a conventional vehicle seat belt to releasably secure the carrier on a vehicle seat against all movement so that the carrier cannot shift when the vehicle suddenly turns, stops, starts, accelerates or decelerates.

When a pet animal, such as a small or medium sized dog or cat, is placed in the harness and secured to the anchor in the top of the platform by the lead, the pet then comfortably rests on the platform. The carrier is pinned in place on the vehicle seat by the vehicle seat belt, with the pet secured thereto as described above. The pet then can easily see through the vehicle windows, while being gently restrained on the platform.

The tethering means prevents the pet from falling off the platform through an open window, getting underfoot, climbing on seat backs or blocking the driver's view. It also prevents the pet from being thrown about in the vehicle during sudden stopping and abrupt vehicle maneuvers. Of considerable importance, both the pet and human occupants of the vehicle are safe and secure. Moreover, the pet will remain calm and quiet, because the changing scenery viewed through the window will keep it visually oriented and interested in the trip. Motion sickness, high excitability and/or depression will not develop because of the calming effect, comfort and good view provided by the carrier. The pet will remain content until the trip is complete, whereupon the harness can be used with a conventional leash to walk the animal from the vehicle. Soiling of the vehicle will not occur because the pet is kept on the platform in a proper frame of mind.

To enhance the pet's comfort, the platform can be provided with a removable water cup and lid, and cushioned carpeting or the like. The base member is sufficiently flexible to absorb shocks. Moreover, at least the front portion of the platform can slope upwardly to help the pet brace itself while standing on the platform and looking around.

The carrier can be made inexpensively of durable, lightweight, strong materials and can be very compact.

BRIEF DESCRIPTION OF THE DRAWING

A better understanding of the present invention may be had from a consideration of the following detailed description, taken in conjunction with the accompanying drawing in which.

DESCRIPTION OF THE PREFERRED EMBODIMENTS

Figure 1:
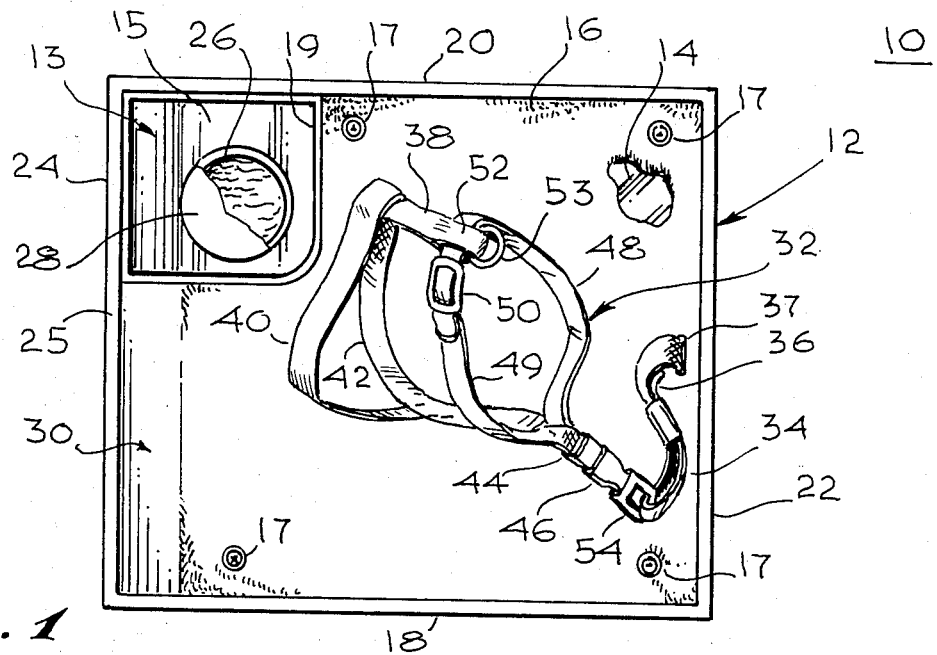
FIG. 1 is a schematic top plan view, partly broken away, of a first preferred embodiment of the improved pet animal carrier of the present invention.
Figure 2:
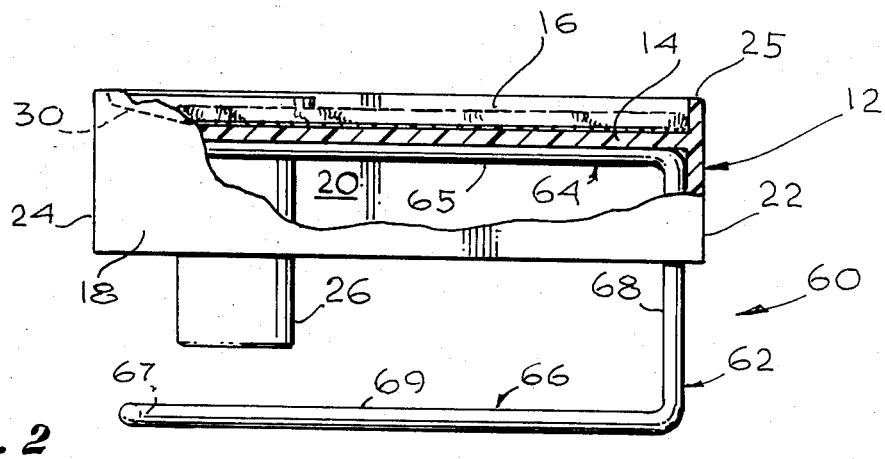
FIG. 2 is a schematic side elevation, partly broken away and partly in section, of the carrier of FIG. 1.
Figure 3:
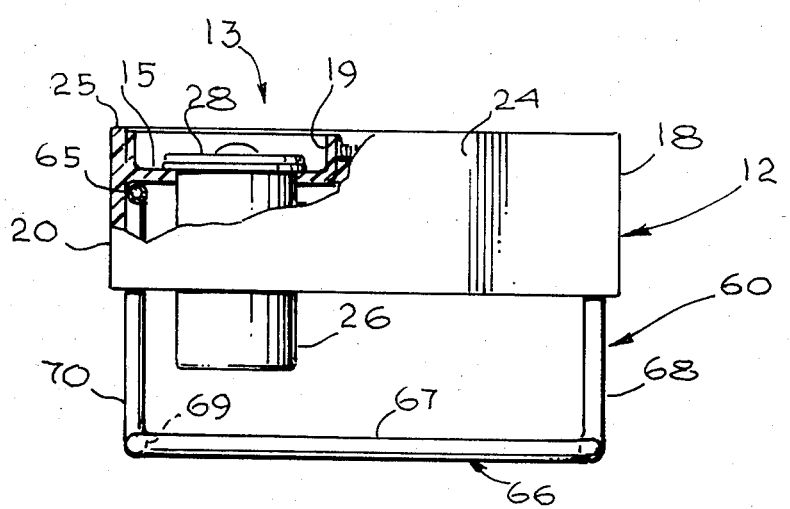
FIG. 3 is a schematic front elevation of the platform and base member portions of the carrier of FIG. 1, partially broken away to show the water cup arrangement.

FIGS. 1-4:

Now referring to FIGS. 1-4 of the drawings, a first preferred embodiment of the improved pet animal carrier of the present invention is schematically depicted therein. Thus, carrier 10 is shown which comprises an upper horizontal platform 12 which may be of molded plastic, wood, metal or the like and which is generally rectangular, with a top generally horizontal wall 14 preferably covered with a layer 16 of carpeting or other resilient shock cushioning material. This layer 16 is preferably secured by releasable fasteners 17 which permit the carpeting to be removed for cleaning. Wall 14 is connected to depending sidewalls 18 and 20, rear wall 22 and front wall 24 and may be molded in one piece therewith, with a slightly raised rim 25, if desired.

Platform 12 is provided with a corner portion 13 having a recessed floor 15 surrounded by the two sidewalls 24, 25 and an upraised border 19. The floor 15 defines an aperature for receiving a removable depending water cup 26 of plastic or the like having an openable lid 28. The corner portion 13 thus defines a region for collecting any water which may be spilled from the cup 26 when the animal is drinking from the cup or otherwise the lid 28 is removed. At least the front portion 30 of wall 14 preferably slopes upwardly (FIG. 1) to provide a bracing area for a pet standing thereon.

Platform 12 is also provided with tethering means in the form of a pet harness 32 releasably connected to an adjustable lead line 34, which forms part of an anchor 36 secured to the platform 12 adjacent the rear center thereof (FIG. 1). The anchor portion 36 extends through an opening 37 in the platform 12 and is fastened to the underside thereof, preferably by plastic rivets or the like. Harness 32 is of the non-choking type and may include a back strap 38 connected at its front end to depending non-choking chest straps 40 and 42 which converge at their lower ends to form a fixture 44 to which lead 34 is releasably connected by a mating fixture 46. Harness 32 may also include a pair of rib straps 48 and 49 rising from the rear of fixture 44 and fitted with a take-up buckle 50 or strap 49, strap 48 first passing through a loop 52 in strap 38, then buckle 50. Strap 38 may also bear a lead ring 53 for attaching harness 32 to a walking lead (not shown) when the pet is released from platform 12.

Figure 4:
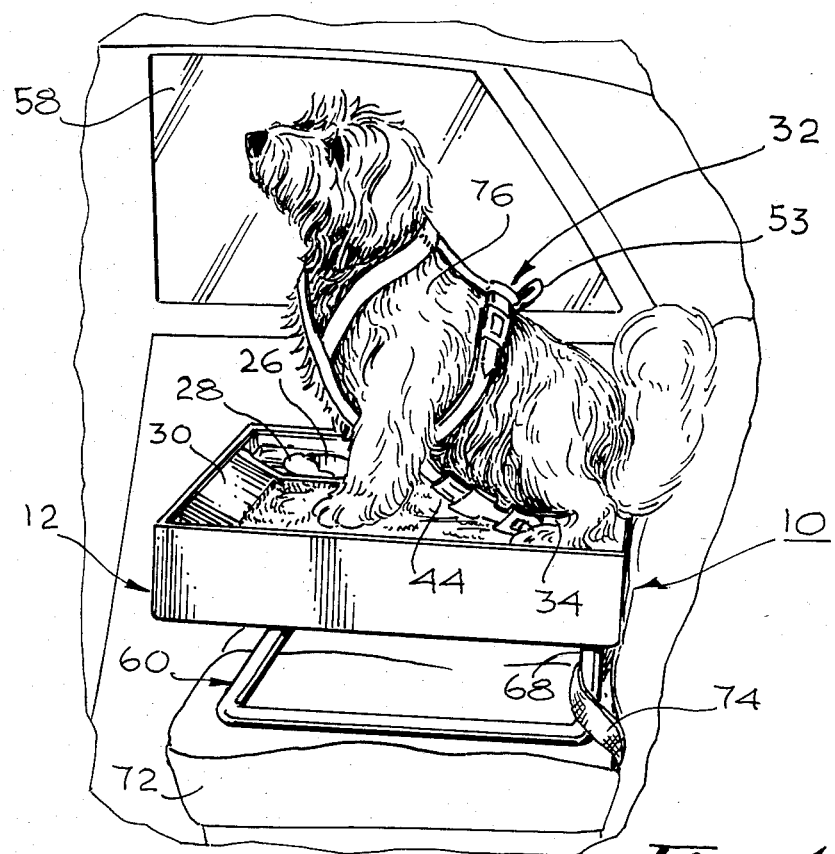
FIG. 4 is a fragmentary schematic perspective view of the carrier of FIG. 1 shown with a pet in place thereon while the carrier is secured on a vehicle seat.

Lead portion 34 may have a take-up buckle 54 and a durable loop to adjust the length of lead 36. Thus, harness 32 is connected to anchor 36 by lead portion 34 below the pet, so that lead portion 34 passes rearwardly between its legs and is out of the way, not tangling or binding the pet when the pet is in place on platform 12. The pet can then stand (FIG. 4), sit, move around or lie down on carpeting layer 16, with a clear view in all directions, including looking out through the vehicle windows 58 (FIG. 4).

In order to hold platform 12 in the proper position it is supported in about horizontal attitude by base member 60, which comprises a preferably single hollow tubular bracket 62 having spaced upper and lower horizontal support portions 64 and 66 connected at the rear sides thereof to integral vertical arms 68 and 70. Portion 64 comprises a spaced parallel pair of forwardly directed arms 65 directly connected to the underside of platform 12 and supporting it at about vehicle window level, while portion 66 is adapted to support carrier 10 on a vehicle seat 72 (FIG. 4). Portion 66 is generally L-shaped with a front cross bar 67 connected to a spaced parallel pair of rearwardly extending horizontal arms 69.

A standard vehicle seat belt 74 can pass in front of arms 68 and 70 to releasably secure the carrier 10 on seat 74. Thus, carrier 10 can be easily held in place against all movement while a pet 76 is securely, comfortably and safely held in harness 32 on platform 12 (FIG. 4). The pet can drink water from cup 26 when lid 28 is removed and can comfortably lie, sit or stand on carpet layer 16 with a clear view out the windows 58.

Figure 5:
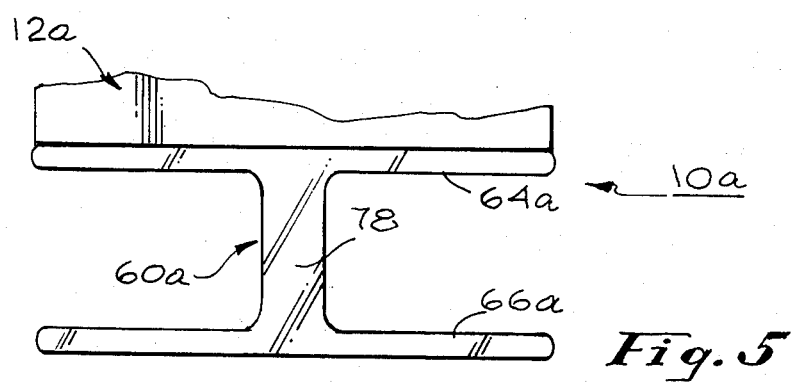
FIG. 5 is a fragmentary schematic rear elevation of a second preferred embodiment of the improved pet animal carrier of the present invention.

FIG. 5:

A second preferred embodiment of the improved pet animal carrier of the present invention is schematically depicted in FIG. 5. Thus, carrier 10a is shown. Components thereof similar to those of carrier 10 bear the same numeral but are succeeded by the letter "a". Carrier 10a differs from carrier 10 only in that base member 60a comprises a pair of spaced horizontal rectangular plates 64 and 66, plate 64 being secured to platform 12a and plates 64 and 66 being integrally connected to a single broad vertical plate 78 at the rear center thereof. Carrier 10 operates similarly to carrier 10.

Figure 6:
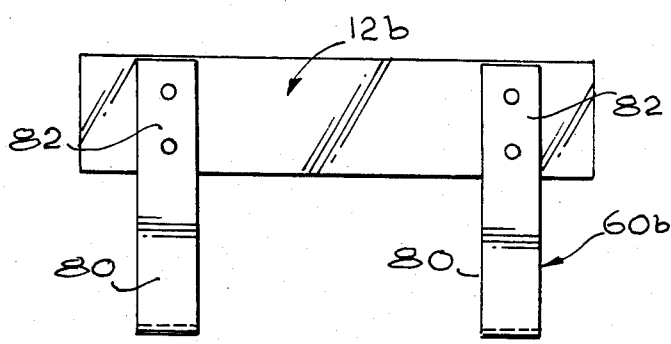
FIG. 6 is a schematic rear elevation of a third preferred embodiment of the improved pet animal carrier of the present invention.
Figure 7:
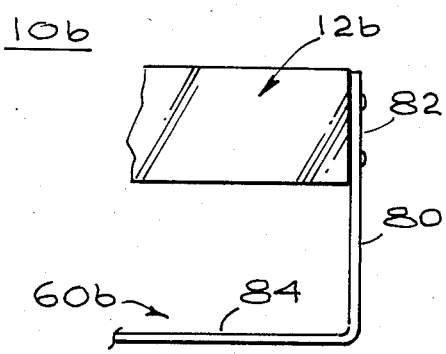
FIG. 7 is a schematic side elevation of the carrier of FIG. 6.

FIGS. 6 and 7:

A third preferred embodiment of the improved pet animal carrier of the present invention is schematically depicted in FIGS. 6 and 7. Thus, carrier 10b is shown. Components thereof similar to those of carrier 10 bear the same numeral but are succeeded by the letter "b". Carrier 10b is identical to carrier 10 except that base member 60b comprises a pair of L-shaped brackets 80, the vertical arms 82 thereof being connected to the rear end of platform 12b at the sides thereof and the forwardly extending horizontal arms 84 thereof extending below platform 12b. Carrier 10b is similar to carrier 10 in operation.

Although there have been described above specific arrangements of a vehicle safety platform for pets in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the annexed claims.

What is claimed is:

1. An improved vehicle safety platform for pets comprising, in combination:
   an animal-supporting platform which is generally rectangular in horizontal outline and comprises a support platform substantially surrounded by an upraised rim with downwardly depending skirt portions joined to said support platform at said rim;

a base member connected to the underside of said platform in a region concealed by said skirt portions and supporting said platform in a generally horizontal position, said base member comprising a bracket having interconnected generally vertical and horizontal arms extending downwardly and forwardly underneath the platform to support the same, said generally vertical arm being disposed at about the rear of said platform, said horizontal arm being adapted to rest on the seat portion of a vehicle seat with said platform spaced above the seat near the level of a vehicle window; and releasable pet tethering means anchored to the platform.

2. The combination of claim 1 wherein said harness includes downwardly converging chest straps connected at the lower junction thereof to said flexible lead line, wherein said tether lead is adjustable in length, and wherein said harness further includes interconnected rib and back straps, the latter bearing a lead ring.

3. The combination of claim 1 wherein said platform comprises a generally rectangular box, the upper surface of which bears a layer of cushioning material.

4. The combination of claim 3 wherein said layer of cushioning material comprises a section of carpeting, and further including releasable fastening means for releasably securing said layer to the upper surface of the platform, whereby the carpeting may be removed for cleaning.

5. The combination of claim 3 wherein at least a part of said upper surface slopes upwardly at the forward end of the platform to facilitate bracing by a pet positioned on said platform.

6. The combination of claim 5 further including a cup inset in said top surface adjacent the front end thereof for water or the like, said cup having a removable sealing lid.

7. The combination of claim 6 wherein the platform includes a recessed well portion adjacent the forward end of the platform, said well portion being surrounded by upraised border walls surrounding said cup for collecting liquid which may be spilled therefrom.

8. The combination of claim 7 wherein said platform is of molded plastic, wherein said cup is of plastic and removable from the well portion, wherein said harness and lead are fabric, and wherein said base member is a single piece of generally tubular steel.

9. The combination of claim 1 wherein said bracket is generally L-shaped and has vertical and lower horizontal arms at each of two opposite sides of said platform, said lower horizontal arms being oriented to rest on the seat portion of a vehicle seat and to support the platform therefrom.

10. The combination of claim 9 wherein said vertical arms are connected to said rear of said platform.

11. The combination of claim 1 wherein said bracket includes lower horizontal arms joined by a cross member at the forward ends of said horizontal arms and vertical arms connected to the rearward ends of the horizontal arms at each of two opposite sides of said platform.

12. The combination of claim 11 wherein the bracket is adapted to be secured in position on a vehicle seat by a standard seat belt, said vertical and lower horizontal arms being joined in a configuration for looping and buckling said seat belt thereover to maintain the safety platform in said secure position.

13. The combination of claim 11 wherein the upper ends of said vertical arms are connected to a pair of upper horizontal arms directly connected to the underside of said platform.

14. The combination of claim 13 wherein the vertical arms, the upper and lower horizontal arms and the cross member are integrally formed from a single piece of hollow tubing.

15. The combination of claim 1 wherein the tethering means comprises a flexible, removable non-choking pet harness, a flexible tether lead secured at one end to the platform, and releasable buckle means positioned between the free end of the lead and the harness.

16. The combination of claim 15 wherein the harness further includes a flexible lead line extending to the buckle means.

* * * * *

UNITED STATES PATENT AND TRADEMARK OFFICE
CERTIFICATE OF CORRECTION

PATENT NO. : 4,597,359
DATED : July 1, 1986
INVENTOR(S) : Maurice D. Moorman

It is certified that error appears in the above—identified patent and that said Letters Patent is hereby corrected as shown below:

Claim 2, line 1, after "claim" delete "1" and substitute --16--.

Signed and Sealed this

Sixteenth Day of February, 1988

Attest:

DONALD J. QUIGG

*Attesting Officer*  *Commissioner of Patents and Trademarks*